United States Patent
Scholz et al.

(10) Patent No.: US 6,926,330 B2
(45) Date of Patent: Aug. 9, 2005

(54) REMOVABLE ROOF FOR A MOTOR VEHICLE

(75) Inventors: Andre Scholz, Wiernsheim (DE); Reiner Armbruster, Muehlacker (DE); Wolfgang Braun, Ebersbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/787,249

(22) Filed: Feb. 27, 2004

(65) Prior Publication Data

US 2004/0232734 A1 Nov. 25, 2004

(30) Foreign Application Priority Data

Feb. 28, 2003 (DE) .......................................... 103 08 762

(51) Int. Cl.[7] .............................................. B60R 11/00
(52) U.S. Cl. ..................................... 296/37.1; 296/218
(58) Field of Search ................................ 296/218, 37.1

(56) References Cited

U.S. PATENT DOCUMENTS

| | | | |
|---|---|---|---|
| 2,215,363 A | | 9/1940 | Ruppel et al. |
| 3,635,518 A | | 1/1972 | Eger |
| 4,171,078 A | * | 10/1979 | Morgan ....................... 224/550 |
| 4,467,944 A | * | 8/1984 | Manko et al. ............ 224/42.32 |
| 4,718,710 A | * | 1/1988 | Iwamura et al. ............ 296/37.1 |
| 5,193,874 A | * | 3/1993 | German et al. ............ 296/37.1 |

FOREIGN PATENT DOCUMENTS

| | | | |
|---|---|---|---|
| DE | 1505551 | | 1/1970 |
| DE | 9406435.0 | | 7/1994 |
| JP | 404358924 | * | 12/1992 ................. 296/218 |
| JP | 2981947 | | 9/1999 |

OTHER PUBLICATIONS

English translation of previously submitted German Office Action dated Oct. 21, 2003.

* cited by examiner

*Primary Examiner*—Dennis H. Pedder
(74) *Attorney, Agent, or Firm*—Crowell & Moring LLP

(57) ABSTRACT

A removable roof designed for a motor vehicle can be inserted into a stowage space of a body of the motor vehicle in a state detached from the body of the motor vehicle and is held in position using receptacles and holding devices. In order to optimize accommodation, two roof elements, which are separable on a median longitudinal plane of the body, are fixed in position, superposed as a first roof element and as a second roof element, into the receptacles of the stowage space using holding devices.

14 Claims, 6 Drawing Sheets

REMOVABLE ROOF FOR A MOTOR VEHICLE

This application claims the priority of German application 103 08 762.1, filed Feb. 28, 2003, the disclosure of which is expressly incorporated by reference herein.

Cross-references to commonly assigned U.S. patent application Ser. Nos. 10/788,252, titled REMOVABLE ROOF FOR A MOTOR VEHICLE, filed Feb. 27, 2004, Ser. No. 10/787,250, titled LOCK FOR A REMOVABLE ROOF, filed Feb. 27, 2004, and Ser. No. 10/788,251, titled LOCKING DEVICE FOR A REMOVABLE TOP, filed Feb. 27, 2004, are hereby made.

BACKGROUND AND SUMMARY OF THE INVENTION

The present invention concerns a removable roof for a motor vehicle that can be inserted into a stowage space of a body of the motor vehicle in a state in which it is detached from the body of the motor vehicle, and which can be held in place using receptacles of the storage space and holding devices.

A removable roof, known from U.S. Pat. No. 2,215,363, can be moved through guide apparatuses from a closed position to an open position and vice versa. In the open position, the roof rests in a stowage space constructed as a trunk.

A roof of dimensionally rigid plastic that is detachable from a motor vehicle, known from U.S. Pat. No. 3,635,518, arches over a passenger space in an operating position, for example, between a windshield frame and a roll bar. In the position where it is removed from the motor vehicle, the aforementioned roof can be accommodated in a stowage space, which is covered by means of a hood. Receptacles that enclose the edges of the roof serve for the mounting the roof, whereby one of the receptacles includes a plastic section that can be moved into a position releasing the adjacent edge of the roof.

One object of this invention is to configure a removable roof of a motor vehicle in such a way that it can easily be inserted into a stowage space specified as to volume of a body of a motor vehicle. It is also an object to guarantee that the mounting in the stowage space for the roof is distinguished by simplicity and good function.

These objects are accomplished according to the invention by providing first and second roof elements which are separable in a median longitudinal plane of the body, with the first roof element and the second roof element insertable superposed into the receptacles of the stowage space and fixable in position using the holding devices. Additional features refining the invention are reflected by dependent claims. A process of inserting the removable roof into a storage space is also claimed.

Advantages primarily obtained with the invention are that the first roof element and the second roof element can be accommodated in a favorable position in a compactly designed stowage space due to their superposed arrangement using the receptacles and the holding devices. Moreover, it is advantageous that the first roof element is arranged as the lower roof element rotated by approximately 180° in relation to the construction position of the roof and the second roof element is arranged as the upper roof element in the construction position in the stowage space. The manual insertion process of both roof elements into the stowage space is facilitated by the receptacles that bound the corners of the roof elements in a form-locking manner. These receptacles are formed by contour section-bearing inserts of the stowage space so that at least one part of the receptacles is provided with contour sections for the upper and lower roof elements. Finally, the holding devices are represented as lashing elements, the ends of which interact by way of interposed gripping elements with vehicle-fast bracing members.

BRIEF DESCRIPTION OF THE DRAWINGS

A design of the invention that will be described in greater detail is illustrated in the drawings.

DETAILED DESCRIPTION OF THE INVENTION

Figure 2:
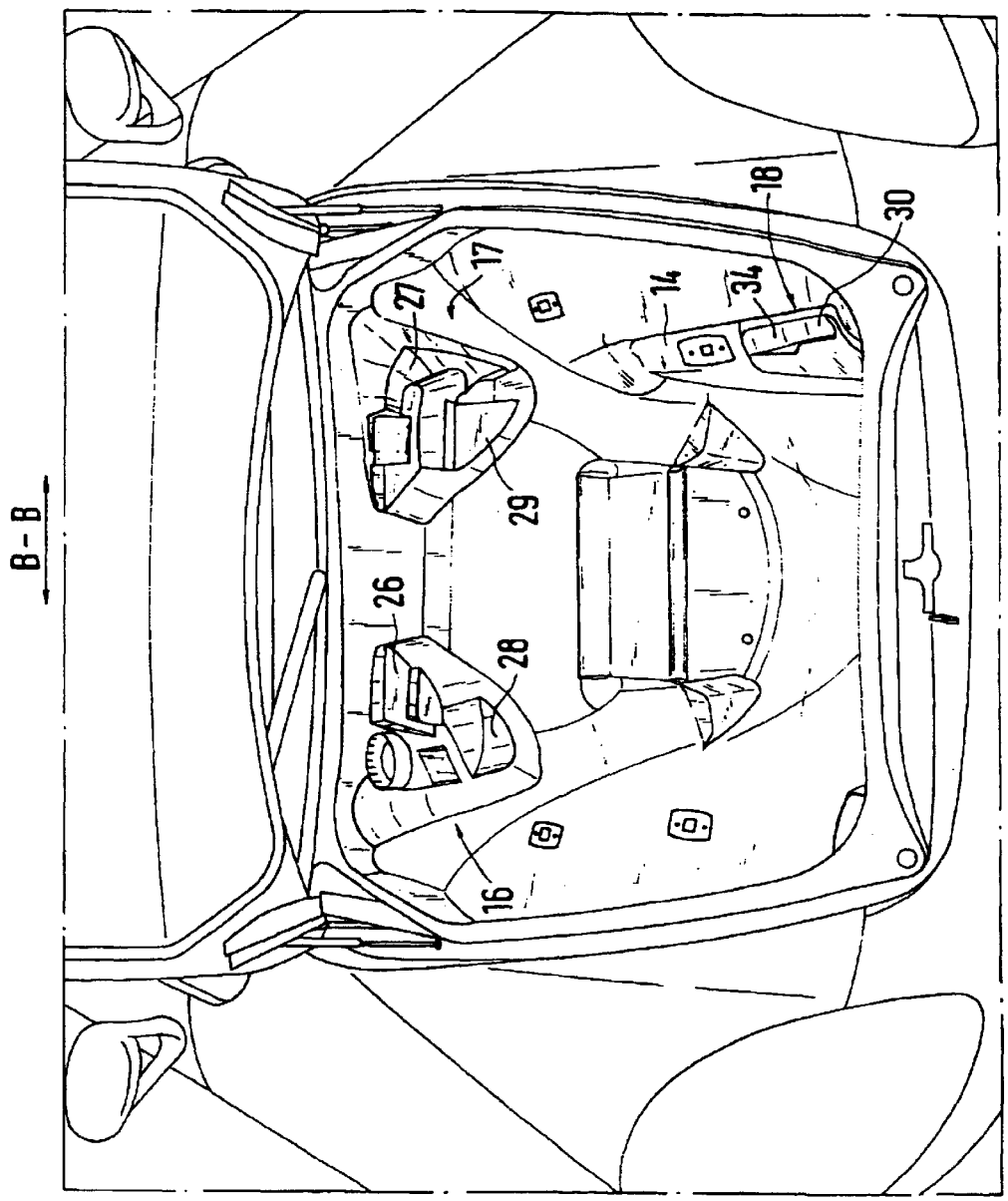
FIG. 2 is a three quarters view from above the front of a stowage space of the motor vehicle.
Figure 3:
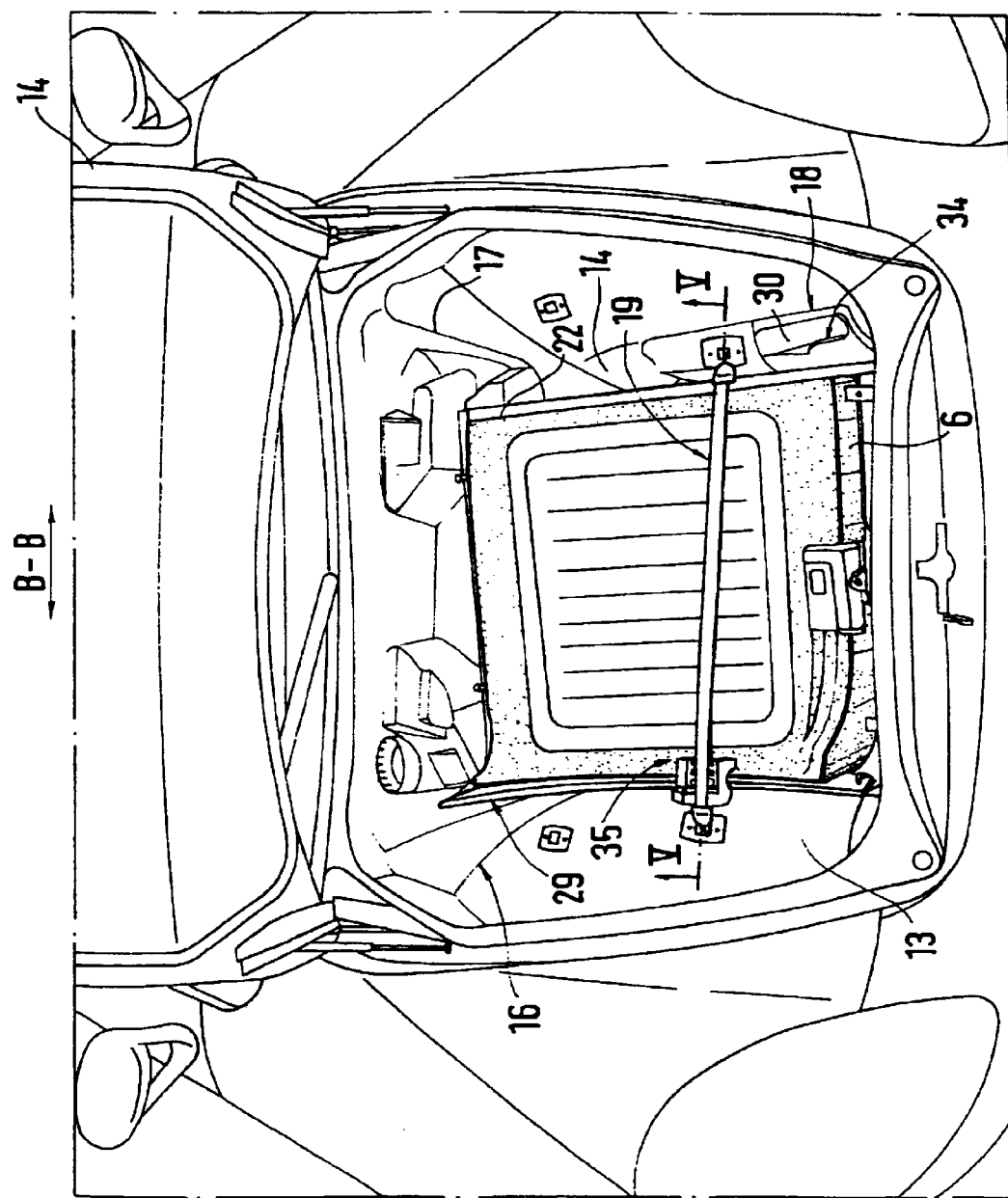
FIG. 3 is a view corresponding to FIG. 4 with a first roof element.

A motor vehicle 1 of the sports car type, with dynamic and striking styling as well as demanding motor performance, is driven by a drive unit (not represented) arranged between wheel axles but adjacent to the rear axis, and includes a body 2 with a windshield frame 3 and a roll bar 4. A removable roof 5 made of dimensionally rigid material or plastic extends between the windshield frame 3 and a roll bar 4 and includes two roof elements 6 and 7 assembled in a median longitudinal plane A—A of the motor vehicle 1. In a state where the roof 5 is detached from the body 2, there exists the possibility of inserting it or its roof elements 6 and 7 into a stowage space 8 that extends between the nose 9 to the windshield 10. The stowage space 8 is constructed in the form of a trunk and is covered using a hood 11, whereby a trough-like stowage space wall 12 possesses upright sidewall sections 13 and 14, which pass over into a bottom 15. In this stowage space configured in this manner, the first roof element 6 and the second roof element 7 are arranged superposed (FIGS. 5 and 6), mounted in receptacles 16, 17 and 18 and fixed in position using holding devices 19 and 20 (FIGS. 2, 3 and 4).

Figure 1:
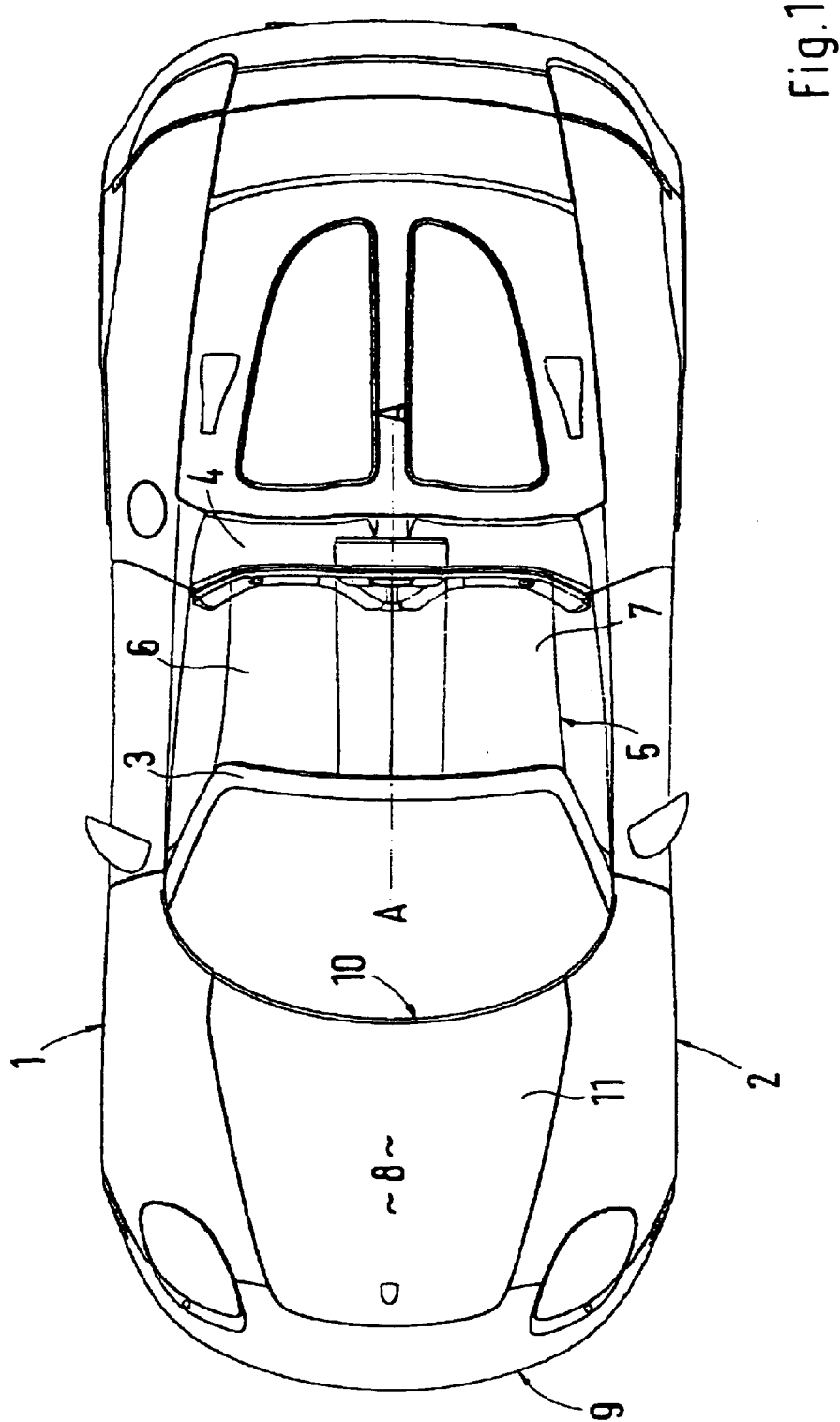
FIG. 1 is a view from above of a motor vehicle.
Figure 5:
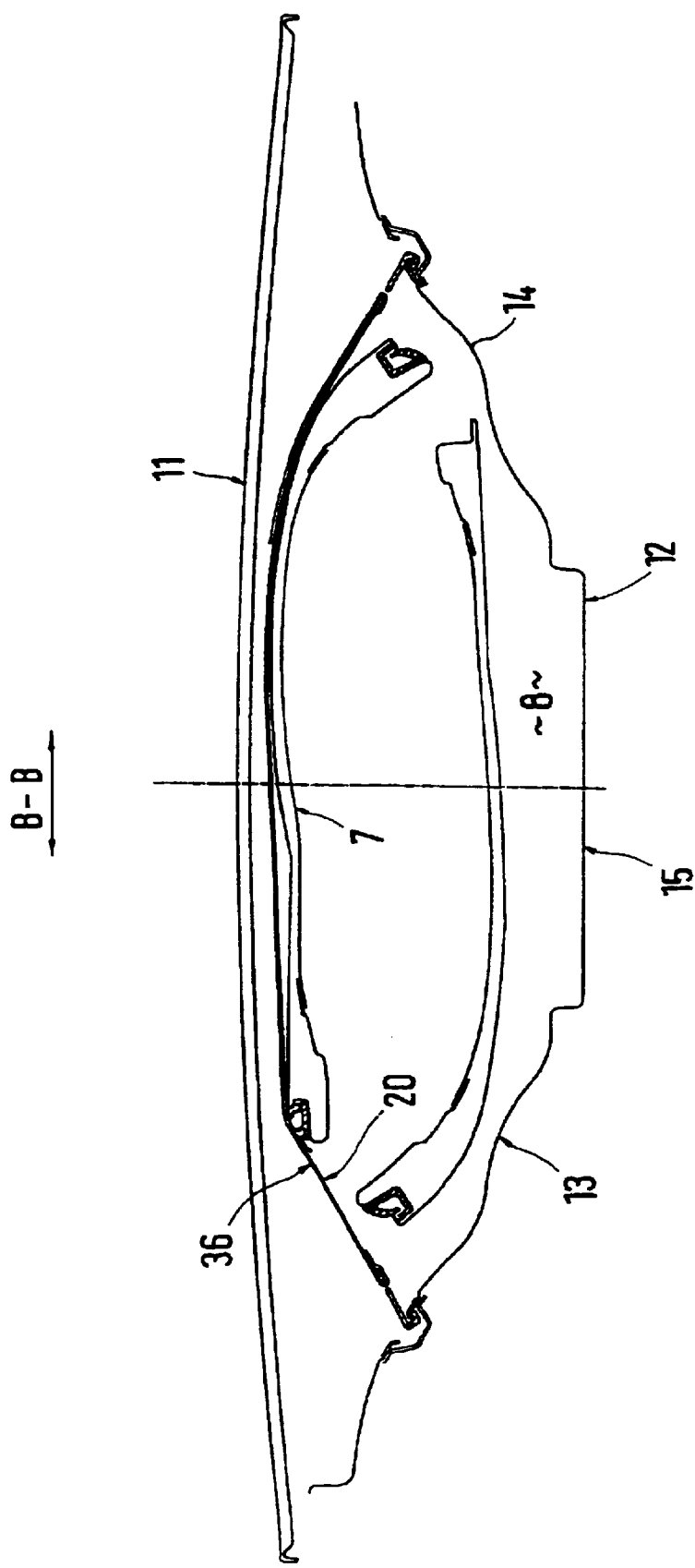
FIG. 5 is a sectional view along line V—V of FIG. 3.
Figure 6:
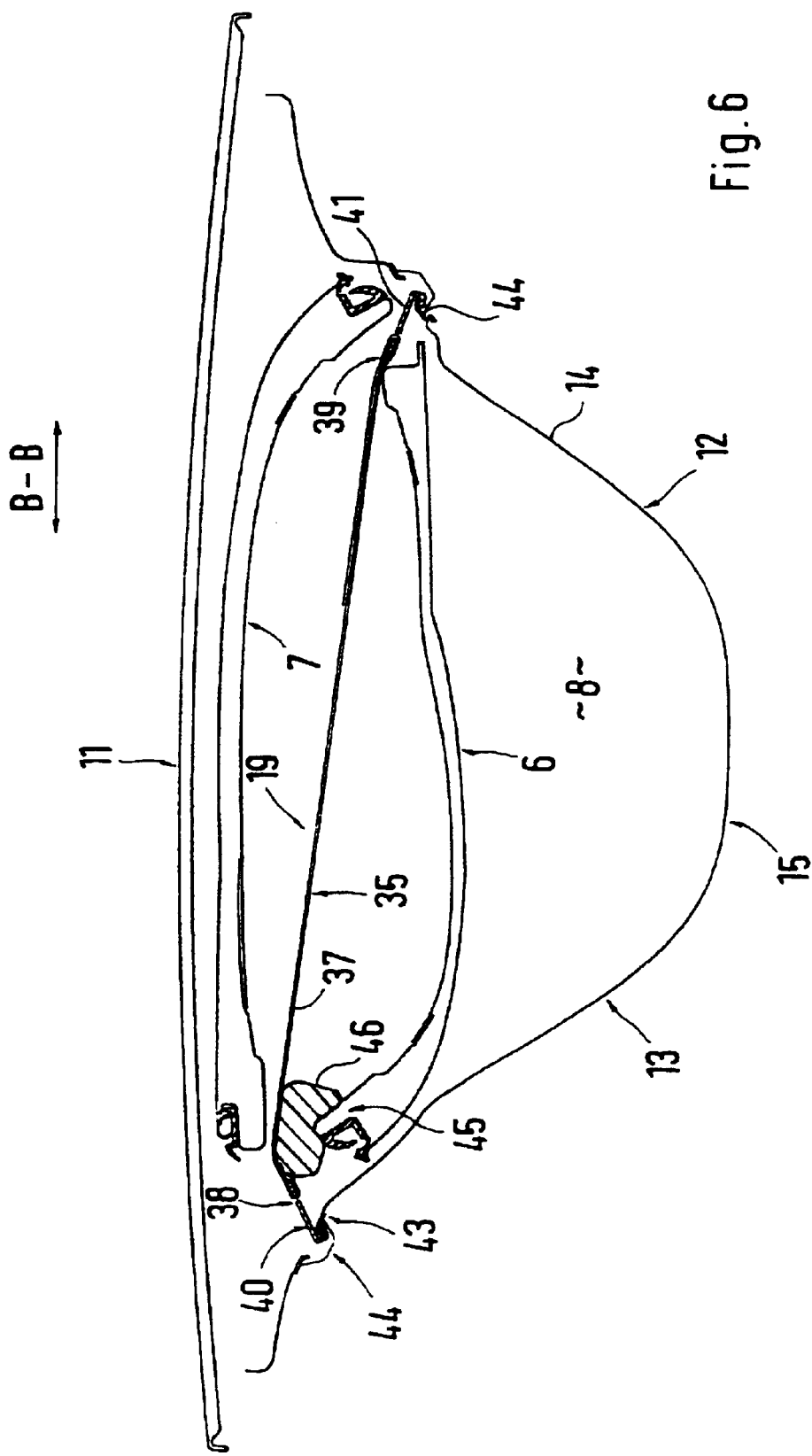
FIG. 6 is a sectional view along line VI—VI of FIG. 4.

Moreover, the first roof element 6 is constructed as lower roof element and the second roof element 7 is constructed as the upper roof element, which first roof element 6, that is the lower one, is rotated by 180° in relation to the construction position of the roof 5, in contrast to which the second roof element 7, thus the upper one, approximately occupies the construction position (FIGS. 5 and 6). The construction position of the roof 5 is apparent from FIG. 1 and corresponds to the state where it runs positioned between windshield frame 3 and roll bar 4.

Figure 4:
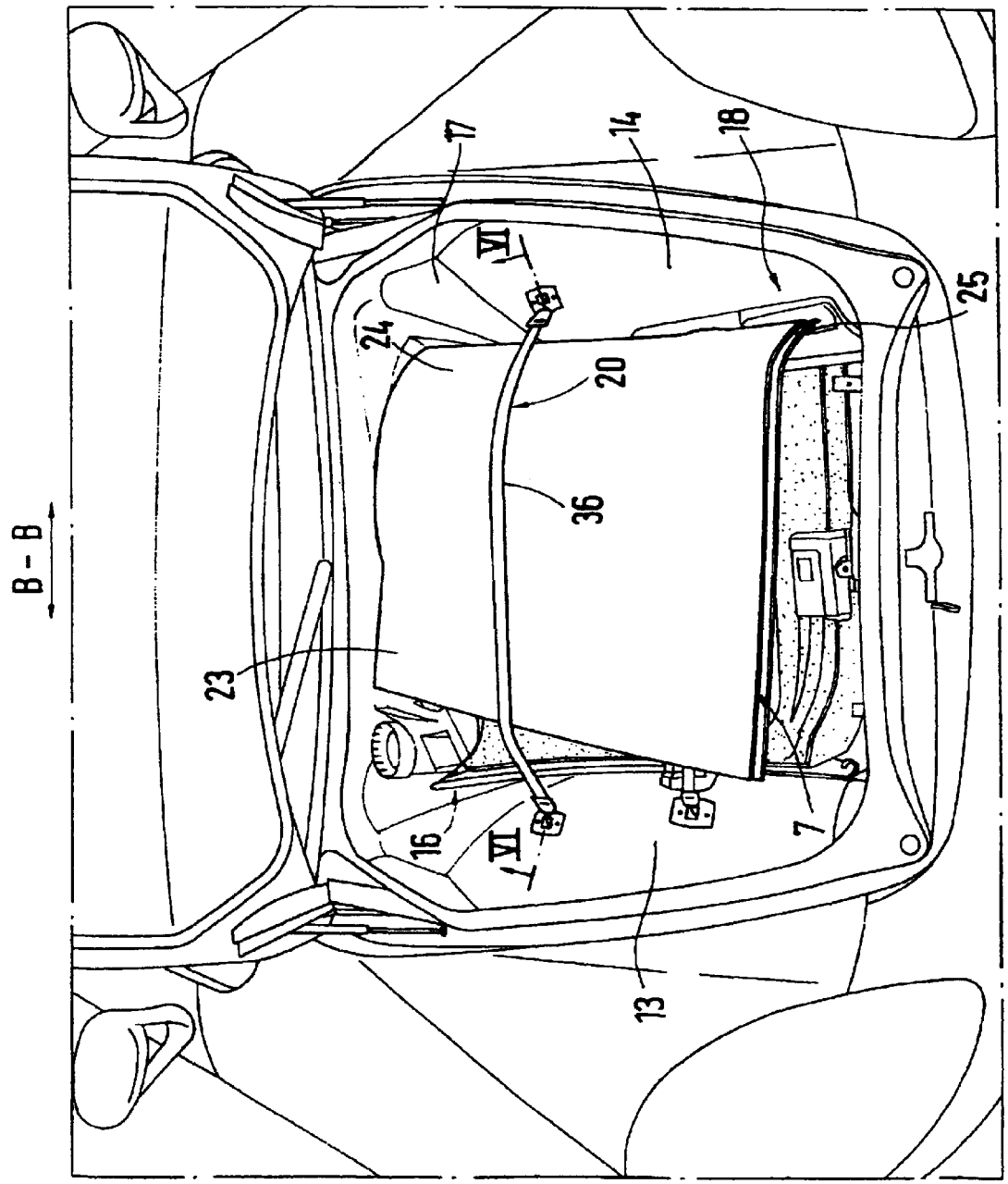
FIG. 4 is an additional view with a first roof element and a second roof element.

The receptacles 16, 17 and 18 bound in a form-locking manner the corners, such as corner 22, of the first roof element 6 (FIG. 3) or corners 23, 24 and 25 of the second roof element 7 (FIG. 4). In addition to this, the receptacles 16, 17 and 18 are provided with contour sections 26, 27 and 28, 29 as well as 30 that are provided in inserts of plastic of stowage space 8. The contour sections 26, 27 or 28, 29 for the first and second roof elements 6, 7 are incorporated into receptacles 16 and 17. Receptacle 18, including a slot-like contour section 34, is arranged in the sidewall section 14 of the stowage space 8.

The holding devices 19, 20 for the first roof element 6 and the second roof element 7 are formed by lashing elements 35, 36 that extend between the side wall sections 13, 14, that is, the aforementioned locking elements run in a direction transverse in relation to the motor vehicle B—B, and the first, lower roof element 6 as well as the second, upper roof element 7 are held by at least one lashing element, namely 35 or 36.

Each lashing element, for example 35, is provided with gripping elements 40, 41 on its ends 38, 39 connected with a flexible lashing band 37 (FIG. 6) that have U-shaped cross sections and cooperate with lash-like bracing elements 43. The bracing elements 43 are components of clasping elements 44, which are incorporated sunk into sidewall sections 13, 14 of the stowage space 8. Finally, a bracing insert 46 is provided between a lateral roof edge 45 of the first, lower roof element 6 and the associated lashing element 35 or lashing band 37 that assures a selective guidance of the lashing band 37.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removable roof for a motor vehicle that can be inserted into a stowage space of a body of the motor vehicle in a state in which it is detached from the body of the motor vehicle, and which can be held in place using receptacles of the stowage space and holding devices, comprising:

first and second roof elements which are separable in a median longitudinal plane of the body, wherein the first roof element and the second roof element are insertable superposed into the receptacles of the stowage space and fixed into position using the holding devices, and wherein the receptacles are configured to abut corners of the roof elements in a form-locking manner.

2. Removable roof according to claim 1, wherein the first roof element is arranged as a lower roof element rotated approximately 180° in relation to a construction position and the second roof element is arranged as an upper roof element in approximately the construction position in the stowage space.

3. Removable roof according to claim 1, wherein the receptacles are represented by contour segment-bearing inserts of the stowage space.

4. Removable roof according to claim 1, wherein at least first parts of the receptacles are provided with contour sections for the first, lower roof element and the second, upper roof element.

5. Removable roof according to claim 1, wherein the holding devices are constructed as lashing elements with ends which interact with bracing members by way of interposed gripping elements.

6. Removable roof according to claim 5, wherein the bracing members are incorporated largely sunk into the stowage space as clasping elements.

7. Removable roof according to claim 1, wherein the first roof element is a lower roof element and the second roof element is an upper roof element, and wherein the first and second roof elements are respectively held in place with at least one lashing element.

8. Removable roof according to claim 7, wherein the lashing elements run in a direction transverse in relation to the motor vehicle.

9. Removable roof according to claim 8, wherein a bracing insert is provided between a lateral roof edge of the first, lower roof element and the associated lashing element.

10. Removable roof according to claim 2, wherein at least first parts of the receptacles are provided with contour sections for the first, lower roof element and the second, upper roof element.

11. Removable roof according to claim 3, wherein at least first parts of the receptacles are provided with contour sections for the first, lower roof element and the second, upper roof element.

12. Removable roof according to claim 5, wherein the first roof element is a lower roof element and the second roof element is an upper roof element, and wherein the first and second roof elements are respectively held in place with at least one lashing element.

13. Removable roof according to claim 12, wherein the lashing elements run in a direction transverse in relation to the motor vehicle.

14. Removable roof according to claim 13, wherein a bracing insert is provided between a lateral roof edge of the first, lower roof element and the associated lashing element.

* * * * *